US009529359B1

(12) United States Patent
Annan et al.

(10) Patent No.: US 9,529,359 B1
(45) Date of Patent: Dec. 27, 2016

(54) INTERACTIVE BEHAVIOR ENGAGEMENT AND MANAGEMENT IN SUBORDINATE AIRBORNE ROBOTS

(71) Applicant: Sprint Communications Company L.P., Overland Park, KS (US)

(72) Inventors: Brandon C. Annan, Westwood Hills, KS (US); Joshua R. Cole, Overland Park, KS (US); Deborah L. Gilbert, Overland Park, KS (US); Dhananjay Indurkar, Overland Park, KS (US)

(73) Assignee: Spring Communications Company L.P., Overland Park, KS (US)

( * ) Notice: Subject to any disclaimer, the term of this patent is extended or adjusted under 35 U.S.C. 154(b) by 300 days.

(21) Appl. No.: 14/592,677

(22) Filed: Jan. 8, 2015

(51) Int. Cl.
G05D 1/00 (2006.01)
B64D 27/24 (2006.01)
B64C 39/02 (2006.01)
B64F 1/36 (2006.01)

(52) U.S. Cl.
CPC .......... G05D 1/0016 (2013.01); B64C 39/024 (2013.01); B64D 27/24 (2013.01); B64F 1/362 (2013.01); G05D 1/0088 (2013.01); B64C 2201/042 (2013.01); B64C 2201/066 (2013.01); B64C 2201/108 (2013.01); B64C 2201/141 (2013.01); B64C 2201/146 (2013.01)

(58) Field of Classification Search
CPC .. G05D 1/0016; G05D 1/0038; G05D 1/0094; G05D 1/0088; G05D 1/101; B64C 39/024; B64C 2201/042; B64C 2201/066; B64C 2201/108; B64C 2201/141; B64C 2201/146; B64C 39/026; B64C 2201/00; B64C 2201/02; B64D 27/24; B64F 1/362
See application file for complete search history.

(56) References Cited

U.S. PATENT DOCUMENTS

| 8,463,720 | B1 | 6/2013 | Seale et al. | |
|---|---|---|---|---|
| 8,948,935 | B1 * | 2/2015 | Peeters | B64C 39/024 701/3 |
| 9,051,043 | B1 * | 6/2015 | Peeters | B64C 19/00 |
| 9,087,451 | B1 * | 7/2015 | Jarrell | G08G 5/0069 |
| 9,158,304 | B2 * | 10/2015 | Fleck | G05D 1/0011 |
| 9,213,931 | B1 | 12/2015 | Annan et al. | |

(Continued)

OTHER PUBLICATIONS

Restriction Requirement dated Dec. 7, 2015, U.S. Appl. No. 14/503,385, filed Sep. 30, 2014.

(Continued)

*Primary Examiner* — Tuan C. To (57) ABSTRACT

An unmanned aerial vehicle (UAV) is disclosed. The UAV comprises a battery, a flight mechanism, a radio frequency (RF) transceiver, a processor, a memory, and an application stored in the memory. When executed by the processor, the application discovers an environment where the UAV operates by flying in the environment to determine its boundaries; creates a map of the environment that the UAV flew through; and shares the map with a social robot. The application receives a command from the social robot via the RF transceiver, wherein the social robot receives a verbal request from a user of the social robot, wherein the social robot transforms the user request to a command for the UAV. The application then performs the command from the social robot. The application then lands on a designated charging pad to conserve energy. The application then transmits a report back to the social robot.

20 Claims, 4 Drawing Sheets

(56) References Cited

U.S. PATENT DOCUMENTS

| | | | |
|---|---|---|---|
| 9,375,845 B1 | 6/2016 | Annan et al. | |
| 2007/0156625 A1 | 7/2007 | Visel | |
| 2007/0282765 A1 | 12/2007 | Visel et al. | |
| 2011/0158470 A1 | 6/2011 | Martin et al. | |
| 2012/0280087 A1* | 11/2012 | Coffman | G05D 1/0044 244/175 |
| 2013/0015236 A1 | 1/2013 | Porter et al. | |
| 2013/0126619 A1 | 5/2013 | Del Fiume et al. | |
| 2015/0341540 A1* | 11/2015 | Kim | H04N 5/23203 348/144 |
| 2015/0365159 A1* | 12/2015 | Bosworth | G08G 5/0069 455/11.1 |
| 2016/0063987 A1* | 3/2016 | Xu | B64C 39/024 381/71.12 |
| 2016/0093212 A1* | 3/2016 | Barfield, Jr. | H04N 7/185 348/144 |
| 2016/0116912 A1* | 4/2016 | Nehmadi | G06F 3/0481 701/2 |

OTHER PUBLICATIONS

Notice of Allowance dated Jul. 30, 2015, U.S. Appl. No. 14/607,792, filed Jan. 28, 2015.

Annan, Brandon C., et al., Patent Application entitled, "Synchronizing Robot Motion with Social Interaction," filed Sep. 30, 2014.

Annan, Brandon C., et al., Patent Application entitled, "Sensor Use and Analysis for Dynamic Update of Interaction in a Social Robot," filed Jul. 8, 2015, U.S. Appl. No. 14/794,765.

Notice of Allowance dated Feb. 16, 2016, U.S. Appl. No. 14/503,385, filed Sep. 30, 2014.

Annan, Brandon C., et al., Patent Application entitled, "Dynamic Interactive Robot Dialogue Creation Incorporating Disparate Information Sources and Collective Feedback Analysis," filed Mar. 3, 2016, U.S. Appl. No. 15/060,565.

\* cited by examiner

INTERACTIVE BEHAVIOR ENGAGEMENT AND MANAGEMENT IN SUBORDINATE AIRBORNE ROBOTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Social robots may perform requests for users in environments. Sometimes, robots may not be able to perform certain requests due to mobility limitations. Social robots may be designed in a way that may not allow them to traverse different surfaces or go up and down stairs. Social robots may communicate with people in a social manner, wherein the social robot may reply to questions and statements from users. The social robot may identify particular users and keep a record of them so that it may address those users by their names. Unlike robots on assembly lines, the goal or purpose of social robots may be to interact with people socially: to have conversations with people, to provide companionship to people, to motivate and encourage people, to provide assistance to people, to commiserate with people in times of loss or other difficulty, and the like. Social robots may engage in teaching people, coaching people, or entertaining people.

SUMMARY

In an embodiment, an unmanned aerial vehicle is disclosed. The unmanned aerial vehicle comprises a battery, a flight mechanism actuated by at least one electric motor powered by the battery, a radio frequency transceiver, a processor, a memory, and an application stored in the memory. When executed by the processor, the application discovers an environment where the UAV operates by flying in the environment to determine its boundaries. The application then creates a map of the environment that the UAV flew through. The application then shares the map with a social robot. The application then receives a command from the social robot via the radio frequency transceiver, wherein the social robot receives a verbal request from a user of the social robot, wherein the social robot transforms the user verbal request to a command for the UAV to perform. The application then performs the command from the social robot. The application then lands on a designated charging pad to conserve energy, wherein the designated charging pad charges the UAV's battery. The application then transmits a report back to the social robot when the command is completed via the radio frequency transceiver, wherein the report details that the command was completed.

In an embodiment, a method of performing tasks via an unmanned aerial vehicle (UAV). The method comprises receiving a user verbal request by a microphone of a social robot. The method further comprises transforming the user verbal request to a command for a UAV by a processor of the social robot. The method further comprises transmitting the command via a radio communication link to the UAV by the social robot. The method further comprises receiving a command from a social robot by the UAV. The method further comprises performing the command that is received from the social robot by the UAV, wherein the UAV flies to the location where the command is to be performed. The method further comprises transmitting a report to the social robot by the UAV, wherein the report details that the UAV executed the command. The method further comprises engaging in a dialog with a user of the social robot by the social robot, wherein the social robot recites the report that was transmitted by the UAV.

In an embodiment, a method of performing tasks via a plurality of unmanned aerial vehicles (UAVs). The method comprises receiving a command from a social robot by a first UAV. The method further comprises flying to the location where the command is to be executed by the first UAV. The method further comprises recognizing that a battery of the first UAV has been drained by flying to the location where the command is to be executed. The method further comprises landing on a designated charging pad in close proximity to the first UAV by the first UAV, wherein the designated charging pad charges the first UAV's battery. The method further comprises transmitting the command to a second UAV by the first UAV. The method further comprises performing the command transmitted from the first UAV by the second UAV. The method further comprises landing on another designated charging pad, wherein the designated charging pad charges the second UAV's battery. The method further comprises transmitting a report to the social robot by the second UAV, wherein the report details that the command was executed. The method further comprises engaging in a dialog with a user of the social robot and the plurality of UAVs by the social robot, wherein the social robot recites the report that was transmitted by the second UAV.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods for performing commands from a social robot by an unmanned aerial vehicle (UAV). Social robots may have limitations that may prevent them from traversing different surfaces, going up stairs, and other issues depending on the motor ability of the social robot. The UAV may perform commands transmitted by the social robot when the social robot is unable to complete the task on its own. The commands may comprise one or more of going up stairs, traversing changing surfaces, and other commands that are explained further later on.

In an embodiment, an unmanned aerial vehicle (UAV) comprises an application that receives a command from a social robot. The social robot receives a verbal request from a user of the social robot and transforms the verbal user request to a command for the UAV to perform. With the command received, the UAV may perform the command by flying to the location where the command is to be performed. After performing the command, the UAV may land on a designated charging pad to conserve energy and to recharge a battery of the UAV. The UAV may be charged by being plugged into an outlet on a wall or other methods as well. The UAV generates and transmits a report back to the social robot when the command has been completed via a radio frequency transceiver of the UAV.

In an embodiment, the UAV maps the environment in which it operates, e.g., in part by using a camera that is integrated into the UAV, and stores that map to a memory of the UAV. The UAV may transmit the map to the social robot so that the robot can command the UAV about which area of the environment to go to. The UAV may have sensors that it may use to perform tasks. The sensors may comprise one or more of a temperature sensor, an infrared sensor, and other sensors. For example, the UAV may receive a command from the social robot to check to see if a stove is still on. The UAV may fly to the area where the stove is located; using one of a temperature sensor, an infrared sensor, or another sensor, the UAV may determine that the stove is either on or off. With the information and depending on its remaining power, the UAV may land on a designated charging pad that is capable of charging the UAV. After landing on the charging pad and beginning the charging process, the UAV transmits a report to the social robot via a wireless communication link. The report states that the command was completed and what the results were. The social robot receives the report and then recites the report to the user of the social robot.

In an embodiment, the UAV is capable of addressing and having a dialog with humans using a speaker and a microphone that are integrated into the UAV. The UAV may assume a certain height level relative to the user that is addressing the UAV. For example, if the user that is addressing the UAV is relatively tall (6'0" and taller), the UAV may fly at a level of 20 degrees below the head of the user. If the user that is addressing the UAV is relatively short (5'4" and shorter), a child for example, the UAV may fly at a level of 20 degrees above the head of the user that is addressing the UAV. Users that are of a relatively average height (5'4" to 6'0") may choose whether they would prefer for the UAV to fly at a level of 20 degrees above or 20 degrees below their heads. The UAV may evaluate each user and determine each user's eye level. The UAV may fly at a level of 20 degrees above or 20 degrees below the eye level based on the height of the person or based on a selected user preference. In an embodiment, users may choose and set what level or position they would like for the UAV to fly. There may be a children's mode that users with children may implement so that their children may not change the level that the UAV may fly. During dialog with the user, the robot may fly from side to side at a range of 5 degrees to the left and 5 degrees to the right of the user that is addressing the UAV. This may be the case so that the user feels like that the UAV is engaged with the user in a dialog that is similar to another person who may use hand motions or head nods to denote active engagement in a dialog.

In an embodiment, the social robot and a plurality of UAVs may be implemented to perform tasks. The social robot may receive a verbal request from a user of the social robot. The social robot may transform the user verbal request into a command that it transmits to a UAV. A first UAV receives the command from the social robot. The first UAV flies to the location where the command is to be executed. The UAV may recognize that its battery is low on power. If this is the case, the UAV may attempt to locate a charging pad in close proximity so that it may charge its battery.

The UAV may evaluate its battery charge level before starting the command. If the UAV recognizes that its battery charge is at a level that will be insufficient for completing the command, the UAV may delegate the task to another UAV. The first UAV may land and then transmit the command to a second UAV that has a fuller battery charge level than the first UAV via a wireless communication link. The second UAV may leave another charging pad where it is located, fly to the subject location, and perform the command. The second UAV may land on another charging pad or a clear space in general so as to conserve energy after completing the command.

The UAVs may use a camera that is integrated into the UAVs to determine if there is a space that is large enough for them to land on depending on their size. The UAVs may have knowledge of their dimensions and may use this knowledge to determine a safe landing spot. The UAVs may also determine whether a spot is appropriately flat using the integrated camera so as to avoid sliding off the surface and causing damage to themselves or other items. The UAV may then generate and transmit a report signifying completion of the task to the social robot via a wireless communication link. The social robot then recites the report to the user of the social robot. The social robot may be keep an active record of the current charge level of a UAV or a plurality of UAVs and may be able to communicate with a user of the social robot if the UAV/UAVs are able or unable to perform a command.

With the UAV that is communicatively coupled to the social robot, users may be able to get more functionality out of the social robot notwithstanding its mobility limitations. This adding of functionality adds convenience for the user that owns the social robot. The social robot may be able to allocate tasks that it would normally be unable to perform to the UAV or the plurality of UAVs. The UAVs may be able to fly up stairs that the social robot may not be able to climb, traverse changing surfaces that robot may have trouble going over, and other functions.

Figure 1:
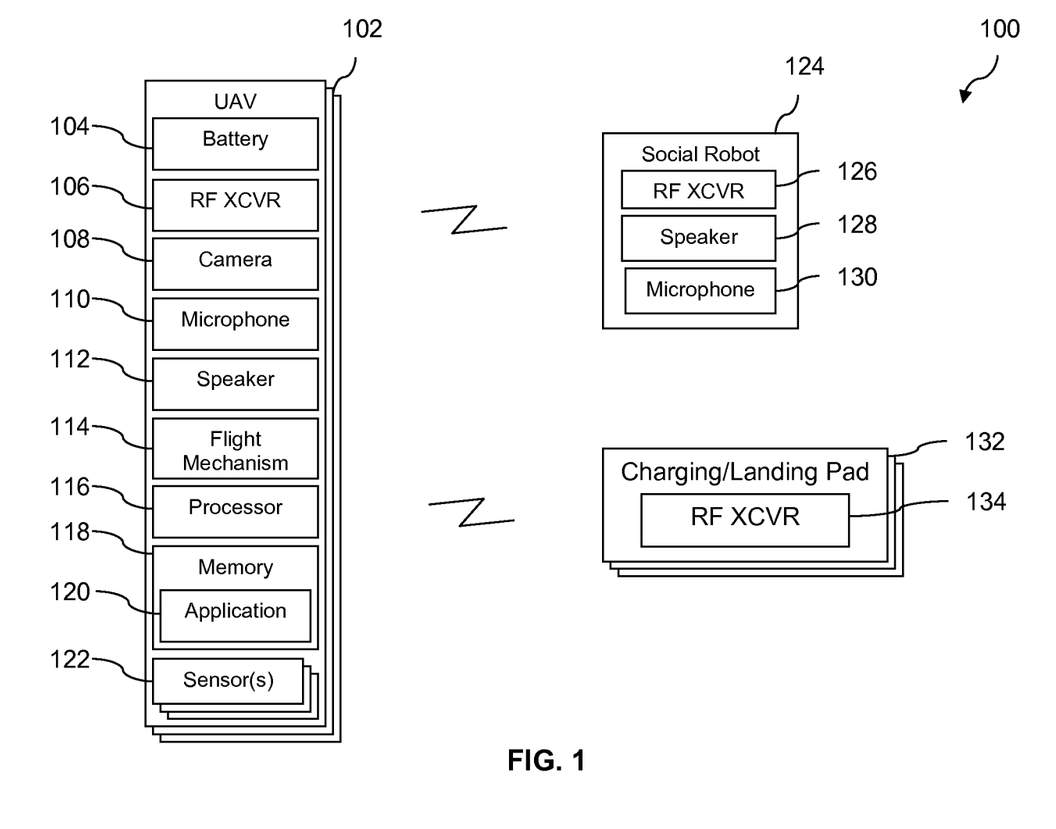
FIG. 1 is a block diagram of a system according to an embodiment of the disclosure.

Turning now to FIG. 1, a system 100 is described. The system 100 comprises an unmanned aerial vehicle (UAV) 102. The UAV 102 comprises a battery 104, a radio frequency transceiver 106, a camera 108, a microphone 110, a speaker 112, a flight mechanism 114, a processor 116, a memory 118 that comprises an application 120, and a plurality of sensors 122. The system 100 further comprises a social robot 124, and the social robot 124 comprises a radio frequency transceiver 126, a speaker 128, and a microphone 130. The system 100 further comprises a charging/landing pad 132 which from herein may be referred to as the charging pad 132. The charging pad 132 comprises a radio frequency transceiver 134. The charging pad 132 may be plugged into a power outlet in an environment that it is in. The flight mechanism may comprise a helicopter multi-blade mechanism that may be driven by an electric motor that is powered by the battery 104.

The UAV 102 is a device that is capable of flight and responding to commands from the social robot 124, but also able to respond to commands from a user of the social robot 124. The UAV 102 may be attached (temporarily) to and dispatched from the social robot 124, but also may be capable of being independent. The UAV 102 may also be able to access places and perform commands and requests that the social robot 124 may be excluded from doing due to its mobility limitations. For example, the social robot 124 may not be able to go up a flight of stairs due to its mobility limitations. The UAV 102 is powered by the battery 104 which may be rechargeable. The UAV 102 may use the charging pad 132 to charge the battery 104 and may also be able to be plugged in to a wall and charged by alternating current (AC), direct current (DC), induce energy from the charging pad 132, and other methods of charging. Energy may be induced by an antenna of the UAV 102 that captures energy from an ambient radio frequency field, for example a radio frequency field emitted by the charging pad 132. The radio frequency transceiver 106 of the UAV 102 may provide a wireless communication link to the social robot 124 and the charging pad 132. In an embodiment, the charging pad 132 may not have the radio frequency transceiver 134. The UAV 102, the social robot 124, and the charging pad 132 may communicate according to a wireless communication link according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, a Wi-Fi wireless protocol, a Bluetooth® wireless protocol, a near field communication (NFC) wireless protocol or another well-known wireless communication protocol.

The camera 108 may be used by the UAV 102 to map an environment. The UAV 102 may make the map and transmit it to the social robot 124 to make the giving of commands more simple for the social robot 124 and the UAV 102. With the map of the environment that the UAV 102 mapped, the social robot 124 may be able to delegate commands to the UAV 102 and the UAV 102 will know exactly where the social robot 124 is commanding the UAV 102 to go. For example, the social robot 124 may command the UAV 102 to perform a command in a specific area of the environment, e.g., an upstairs bedroom. To map the environment that it lives in, the UAV 102 may fly around the environment and may identify rooms or enclosures in the environment using its camera 108. This may involve flying perimeters of rooms to determine their extents and ends. The UAV 102 may further identify passageways that are between the rooms, e.g., doors, hallways and stairways. In an embodiment the hallways and stairways may be identified as rooms themselves by the UAV 102. The UAV 102 may identify the height, width, and breadth of each room. Identifying the height, width, and breadth of each room and passageway allows the UAV 102 to know what height level to fly at and to have knowledge of where barriers are in rooms.

The UAV 102 may also identify objects that are in the rooms of the environment while also identifying the height, width, and breadth of each object in each room and passageway of the environment. Mapping objects that are in each room and passageway allows the UAV 102 to fly around in the home environment without crashing or bumping into objects. Because the UAV 102 mapped the environment, the UAV 102 will know where to go when it receives the command from the social robot 124. In an embodiment, the "map" may be constructed as a table identifying perimeters of rooms with coordinates, for example Cartesian coordinates on a Cartesian coordinate system plane. For example, a wall may be defined by the four points associated with its four right angles. The rooms, passageways, and objects in the rooms and passageway may be mathematically characterized or characterized as some other abstraction. The UAV 102 may transmit at least some of the mapping information to the social robot 124, so that the social robot 124 is informed of the physical layout of the home environment.

The camera 108 may also be used to take pictures of user faces. The UAV 102 may store these pictures and use facial recognition software so that it may recognize a user when a user addresses the UAV 102. The camera 108 may also be used by the UAV 102 while the UAV 102 is flying to determine if the path that the UAV 102 is taking is navigable. This is so if something gets in the way that was not located in a place that was previously mapped, the UAV 102 will be able to fly around the object that is in the way. This may be referred to as obstacle avoidance. The UAV 102 may map obstacles for future avoidance of obstacles.

In an embodiment, the UAV 102 may utilize a flight time table that it discovers or builds over time from experience of flying around in the home environment. This flight time table that is built upon historical flight experiences may help the UAV 102 evaluate the battery 104 discharge relative to the time spent flying in the environment from one location to another. The UAV 102 may revise this flight time table over time based on recent monitoring of its battery depletion as a function of flight time. In this way, as the battery changes over time (e.g., as the battery ages and loses recharging effectiveness) this change can be taken account of in estimating flight time capability before battery discharge. It is understood that the greatest electrical load on the battery at any time may be the electrical load of driving the flight motors, for example electric motors that turn the main helicopter blades of the flight mechanism.

In an embodiment, the UAV 102 may keep a record of the times that it interacts with a particular user or users and recognize when a user has been away for a few days. For example, the UAV 102 may be in a family home environment. The UAV 102 may notice that it has not interacted with a particular user of 4 users in the environment. The UAV 102 may bring up this point to the next user that the UAV 102 interacts with. The UAV 102 may also transmit a message to the social robot 124 about the absence of the particular user. In an embodiment, the UAV 102 may utilize different levels of energy/battery usage and these levels may be chosen by the user of the UAV 102. There may be a "premium performance" option where the UAV 102 may not concern itself in trying to conserve energy until it reaches a particular low power threshold, e.g., the UAV 102 may fly around and perform commands and tasks until it reaches around 10 percent remaining battery 104 life and then look for a charging pad 132 or clear place to land so to recharge. There may be a "power saver" option that the UAV 102 may utilize to remain sufficiently charged to perform command after command. The "power saver" option may be the default mode.

The microphone 110 may be used to receive and record verbal commands from users of the social robot 124. The speaker 112 may be used to respond to users when addressed. The UAV 102 may be programmed to respond with certain phrases depending on what the user has stated to the UAV 102. The flight mechanism 114 may be actuated by the battery 104. The flight mechanism 114 may be comprised of propellers or other means of flight. The processor 116 may execute noise cancellation on inputs from the microphone 110 to eliminate the interference of the sound of the flight mechanism 114 from the microphone input. The processor 116 may execute the application 120. Via the application 120 and other components of the UAV 102, the processor 116 may be said to control the components and the UAV 102. The memory 118 may store the application 120, records and images of users, a map of the environment of the UAV 102, and other information. The application 120 may be used to carry out commands given to the UAV 102 by the social robot 124 and users of the social robot 124. The plurality of sensors 122 may be used to gain information which may be used to perform commands. The plurality of sensors 122 may comprise For example, the UAV 102 may be given a command by the social robot 124 to check and see if a stove has been turned off. The UAV 102 flies to the stove and using one or more of a temperature sensor, an infrared sensor, or other sensors, the UAV 102 is able to determine whether the stove is on or off. The UAV 102 may observe an "on" indicator light signaling that an oven is on. The UAV 102 may analyze the image of the stovetop controls to assure they are off.

In an embodiment, the plurality of sensors 122 may comprise an infrared sensor, a temperature sensor, a gyroscope, a barometer, a hygrometer, and other sensors. The UAV 102 may utilize these sensors to perform tasks and commands from the social robot 124. The UAV 102 may be given a command by the social robot 124 or directly by the user to check the current temperature in the home environment. The UAV 102 may use some of the plurality of sensors 122 to accomplish this task. The UAV 102 may use the temperature sensor to identify the current temperature. In an embodiment, the UAV 102 may be communicatively coupled with a thermostat that is associated with the home environment. The user of the UAV 102 may be able to command the UAV 102 to change the thermostat to a particular temperature.

The social robot 124 may transform user verbal requests that it receives from users into commands for the UAV 102 to perform. The radio frequency transceiver 126 of the social robot 124 may provide a wireless communication link between the social robot 124 and the UAV 102. The speaker 128 and the microphone 130 allow for the social robot 124 to communicate with a user of the social robot 124. The charging pad 132 may provide a charging mechanism for the UAV 102. The optional radio frequency transceiver 134 of the charging pad 132 may provide the UAV 102 the ability to locate the charging pad 132. When looking for a charging pad 132, the UAV 102 may transmit a location message to the charging pad 132. The charging pad 132 may respond to these location messages, indicating where the charging pad 132 is located. The UAV 102 may also use its memory of where things are located in the home environment to locate the charging pad 132. If the charging pad 132 has been moved to a different location, the UAV 102 may use its camera 108 to look and see if there is a charging pad 132 in close proximity or the UAV 102 may transmit location messages out to the charging pads 132, where the charging pads 132 respond to the message and detail where they are located. The UAV 102 may keep a record in the memory 118 of where the charging pad 132 is located in an environment. In an embodiment, while one UAV 102 and one charging pad 132 are referenced in the system 100, it is understood that there may be any number of UAV's 102 and charging pads 132 in the system 100. It is further understood that multiple instances of the system 100 may exist. For example, the system 100 may be installed in a large number of private residences.

In an embodiment, the application 120 is executed by the processor 116 of the UAV 102. The UAV 102 receives a command from the social robot 124 that received a verbal request from a user of the social robot 124. When the social robot 124 receives the user verbal request, the social robot 124 determines whether or not it will be able to follow through with the user verbal request. For example, the social robot 124 may not be able to climb up stairs that are in the environment, when given a task that involves going up stairs, the social robot 124 will delegate the task to the UAV 102. If the social robot 124 determines that it is unable to perform the request, the social robot 124 transforms the user verbal request into a command that it transmits to the UAV 102. The UAV 102 receives the command and then performs the command by flying to the location where the command is to be performed using the flight mechanism 114. The UAV 102 then locates and lands on a charging pad 132 to conserve energy and gain a charge. The UAV 102 then generates and transmits a report to the social robot 124. The report details that the command was performed and what the results of the performance were.

In an embodiment, the UAV 102 may address the user directly. The UAV 102 may land, but it also may continue to fly when addressing a user depending on the available life left in the battery 104. The UAV 102 may recognize particular heights of users when they are standing. The UAV 102 may fly at a certain position relative to the user. For example, if the user is standing and relatively tall (6'0" or over) the UAV 102 may fly at a position that is 20 degrees below the head of the user or another level of degree(s). If another user is standing and relatively short (5'4" or shorter), the UAV 102 may fly at a position of 20 degrees above the head of the user or another level of degree(s). For example, the user that may be addressing the UAV 102 may be a child and it may be in the best interest of the UAV 102 to fly at a higher position so as to avoid damage from being hit by the child.

Users that are of a relatively average height (5'4" to 6'0") may choose whether they would prefer for the UAV 102 to fly at a level of 20 degrees above or 20 degrees below their heads. The UAV 102 may evaluate each user and determine each user's eye level. The UAV 102 may fly at a level of 20 degrees above or 20 degrees below the eye level of the user based on the height of the person or based on a selected user preference. In an embodiment, users may choose and set what level or position they would like for the UAV 102 to fly at. There may be a children's mode that users with children may implement so that their children may not change the level that the UAV 102 may fly.

In an embodiment, the UAV 102 may fly about 8 inches higher than the height of a normatively "tall" person or about 18 inches lower than the height of a normatively "short" person. For example, the UAV 102 may fly at about 6 foot 8 inches or at about 3 foot 10 inches. Alternatively, the UAV 102 may fly about 8 inches taller than an $80^{th}$ percentile height adult (i.e., about 80% of adults are shorter than this height) or about 18 inches lower than a $20^{th}$ percentile height adult (i.e., about 80% of adults are taller than this height).

The UAV 102 may also fly from side to side to side when interacting with a user. The UAV 102 may fly both 5 degrees to the left and 5 degrees to the right periodically while addressing a user. This may be the case in order to give users the sense that UAV 102 is actively engaged in the interaction. In an embodiment, the UAV 102 may be capable of "nodding" in mid-flight, wherein the UAV 102 may simultaneously answer "yes" to a request, command, or statement and "nod" its frame both downward and forward. The UAV 102 may also slightly shake its frame from side to side to indicate "no" when it receives a request that it cannot perform or to answer a question that it recognizes as question that should have an answer of "no." In an embodiment, the UAV 102 may be able to recognize gestures. If a user nods, the UAV 102 may be programmed to recognize this action to mean a response of "yes." If the user shakes his or her head from side to side slightly, the UAV 102 may recognize this action to mean a response of "no."

In an embodiment, when the UAV 102 is flying up a flight of stairs, the UAV 102 may use its camera 108 to evaluate the height incline of the stairs and may keep itself a minimum 3 feet above the stairs so as to avoid crashing into the stairs. The UAV 102 may fly at a relative height of 2 to 3 feet above a user that it is interacting with whom is sitting down or lying down.

The social robot 124 may receive a verbal request from a user that the social robot 124 determines that it cannot perform, e.g., going upstairs to see if a child of the user is in the room they are supposed to be in. The social robot 124 may be able to keep track of the power levels of each of the plurality of UAVs 102 and may give the command to the UAV 102 with the most remaining power. The social robot 124 may also use a map of the environment that the social robot 124 is located in and may also keep a record of the where each of the plurality of UAVs 102 is in the home environment. If all of the UAVs 102 of the plurality of UAVs 102 has the same amount of power or sufficient power to complete the task, the social robot 124 may select the UAV 102 that is in closest proximity to where the task is to be performed.

The social robot 124 may inform the user that it will be unable to complete the request, but that it will send one UAV 102 of a plurality of UAVs 102 to accomplish the request. The social robot 124 may then evaluate the power level of each of the UAVs 102 in the plurality of UAVs 102. In an embodiment, the user of the social robot 124 may instruct the social robot 124 to send the UAV 102 that is in closest proximity with a sufficient charge to accomplish the request. The social robot 124 may by default send the UAV 102 with the most remaining power to accomplish the request.

The social robot 124 determines which UAV 102 has the most remaining power and then transforms the user verbal request into a command that it transmits to the UAV 102 that has the most power. The UAV 102 that has the most power may turn out to be a UAV 102 that is downstairs. The UAV 102 may evaluate a previously recorded map of the home environment and may determine the best path of direction to the location where the command is to be performed. The UAV 102 may lift off from the charging pad 132 or another location that the UAV 102 landed and fly to the stairs via the flight mechanism 114. The UAV 102 may then fly up the stairs. Following its predetermined path, the UAV 102 flies to the room where the child is supposed to be located. The UAV 102 uses its camera 108 to determine if objects may get in the way of its path. The UAV 102 flies into the room and determines that the child is in fact in the room using its camera 108 and facial recognition software that determines the child to be the child in the request. The UAV 102 may then look for a landing spot. The UAV 102 may message the closest charging pad 132 to see if it is available for landing. The UAV 102 and the charging pad 132 may communicate via their radio frequency transceivers 106/134. The UAV 102 determines that the charging pad 132 is available for landing and flies to the charging pad 132 based on the map and the camera 108.

The UAV 102 arrives at the charging pad 132, lands on the charging pad 132, and then begins to generate a report that it will send to the social robot 124. The report comprises information about the result of the command. In this case the report details that the child was located in the room. The UAV 102 transmits the report to the social robot 124, where the social robot 124 then recites the result of the report back to the user of the social robot 124.

In an embodiment, the UAV 102 may keep a record of the commands that it has been given and may recognize a pattern and try to be in certain locations in case the command is to be performed again. For example, a user in the home environment may ask what the temperature is in the home environment is at the main entrance of the home environment every day at a certain time in the afternoon, 5:00 P.M., for example. The UAV 102 may relocate itself from its current location to this particular spot where a charging pad 132 may be located so that it may perform the command if the command is given again.

In an embodiment, the UAV 102 may be able pass through a special-purpose portal to the outside. For example, the UAV 102 may command an electrically actuated door to open and let the UAV pass through and then close. The UAV 102 may be able to check if a grill outside is still on, if a watering hose is turned off, to search for a missing user, or to check if a light is burned out.

In an embodiment, the UAV may identify and use landing locations that are separate from the charging pads 132 to stop when a command is completed and turn off its flight mechanism 114 to conserve power. Additionally, after getting a user's attention, The UAV 102 may land on a landing location, turn off the flight mechanism 114 to conserve power, and perform a dialog with a user from such a stationary, grounded location as a power conservation strategy.

Figure 2:
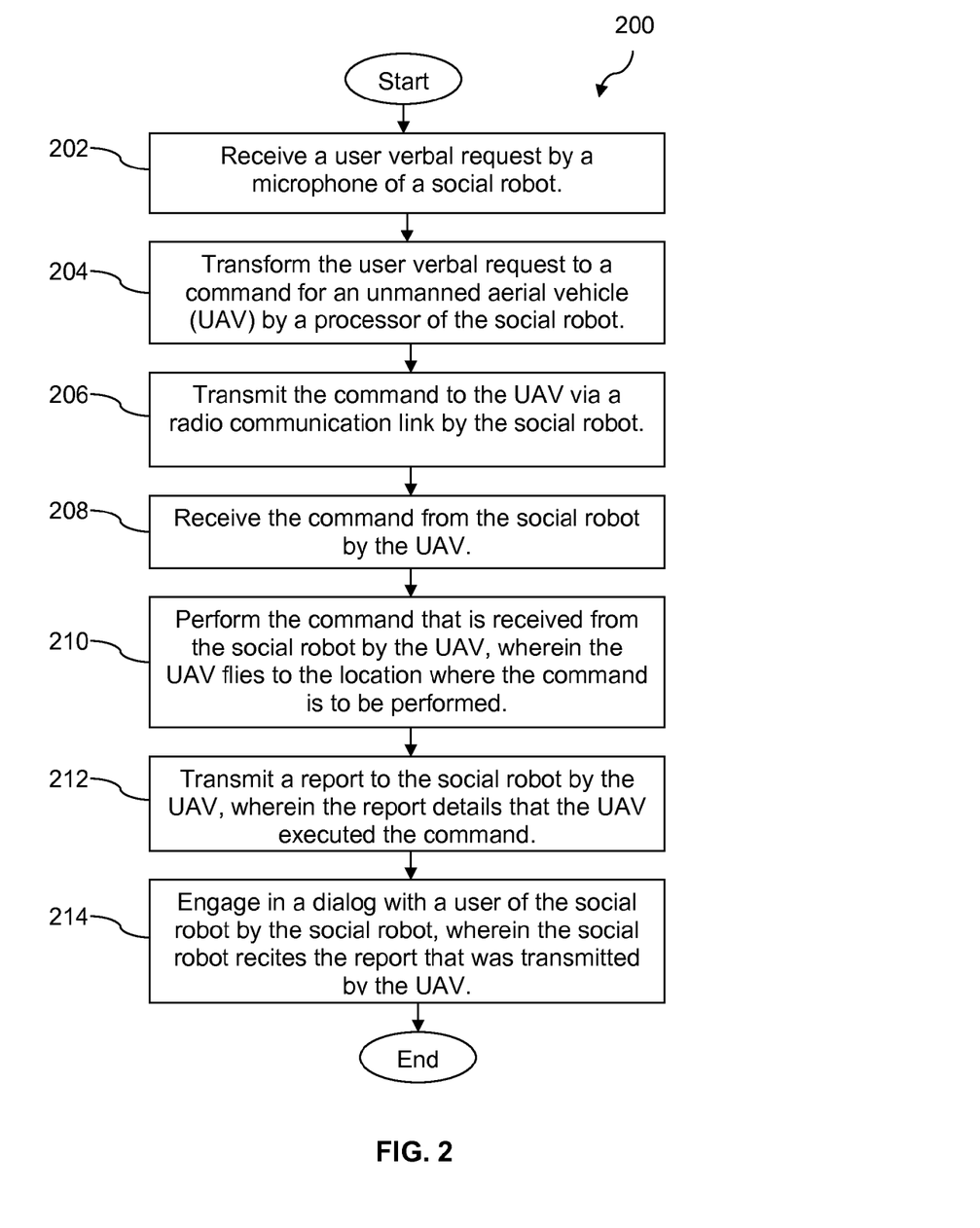
FIG. 2 is a flow chart of a method according to an embodiment of the disclosure.

In FIG. 2, a method 200 is described. At block 202, a social robot receives a user verbal request via a microphone of the social robot. At block 204, the social robot transforms the user verbal request into a command for an unmanned aerial vehicle (UAV) by a processor of the social robot. For example, the social robot performs voice recognition on voice messages received via the microphone, analyzes the voice message to determine the meaning of the voice message, selects a command from an enumerated set of commands that the UAV is programmed to perform. At block 206, the social robot transmits the command to the UAV via a radio communication link. At block 208, the UAV receives the command from the social robot. At block 210, the UAV performs the command that is received from the social robot, wherein the UAV flies to the location where the command is to be performed. For example, the application controls the UAV to perform the command. At block 212, the UAV transmits a report to the social robot, wherein the report details that the UAV executed the command. At block 214, the social robot engages in a dialog with a user of the social robot, wherein the social robot recites the report that was transmitted by the UAV.

Figure 3:
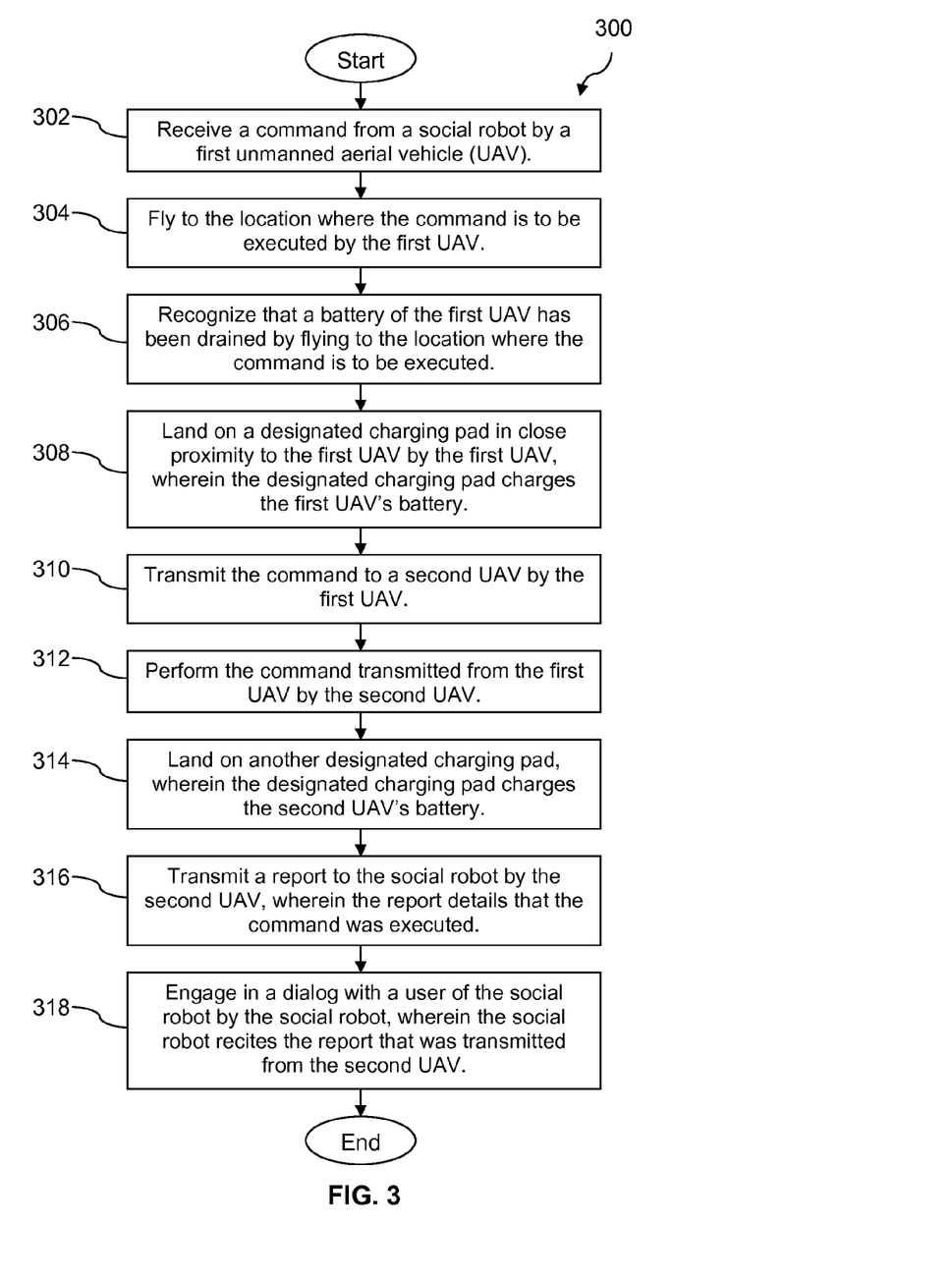
FIG. 3 is a flow chart of a method according to an embodiment of the disclosure.

In FIG. 3, a method 300 is described. At block 302, a first unmanned aerial vehicle (UAV) receives a command from a social robot. At block 304, the first UAV flies to the location where the command is to be executed. At block 306, the first UAV recognizes that a battery of the first UAV has been drained by flying to the location where the command is to be executed. At block 308, the first UAV lands on a designated charging pad in close proximity to the first UAV, wherein the designated landing pad charges the first UAV's battery. At block 310, the first UAV transmits the command to a second UAV via a wireless communication link. At block 312, the second UAV performs the command transmitted from the first UAV. At block 314, the second UAV lands on another designated charging pad, wherein the designated charging pad charges a battery of the second UAV. At block 316, the second UAV transmits a report to the social robot, wherein the report details that the command was executed. At block 318, the social robot engages in a dialog with a user of the social robot, wherein the social robot recites the report that was transmitted from the second UAV.

Figure 4:
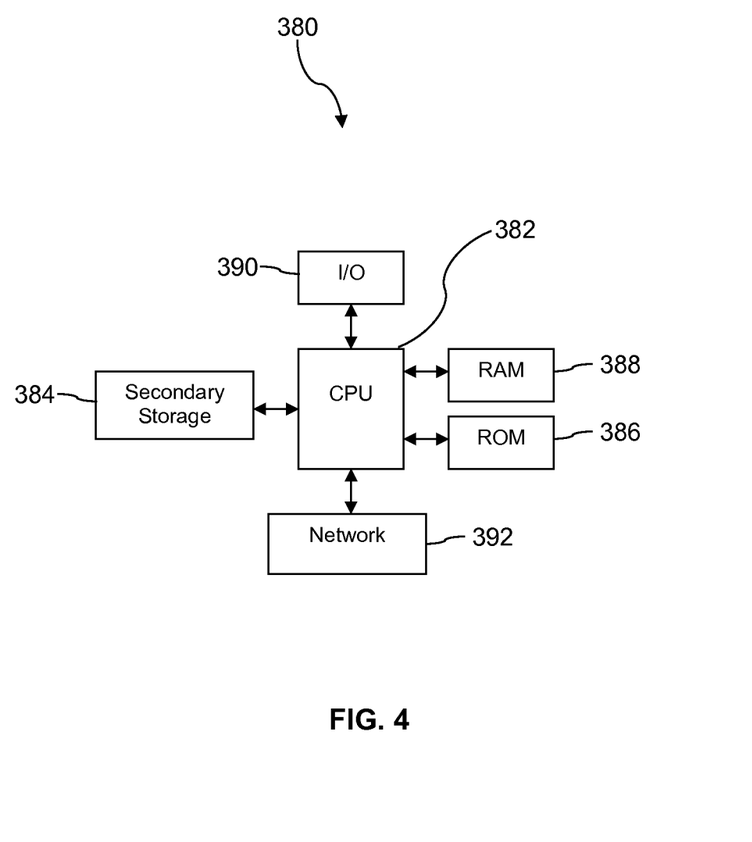
FIG. 4 illustrates an exemplary computer system suitable for implementing the several embodiments of the disclosure.

FIG. 4 illustrates a computer system 380 suitable for implementing one or more aspects of the embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An unmanned aerial vehicle (UAV), comprising:
   a battery;
   a flight mechanism actuated by at least one electric motor powered by the battery;
   a radio frequency transceiver;
   a processor;
   a memory; and
   an application, stored in the memory that, when executed by the processor, discovers an area of the environment where the UAV operates by flying in the environment to determine its boundaries, creates a map of the environment that the UAV flew through, shares the map with a social robot, receives a command from the social robot via the radio frequency transceiver, wherein the social robot receives a verbal request from a user of the social robot, and wherein the social robot transforms the verbal request to a UAV command for the UAV to perform, performs the UAV command from the social robot, lands on a designated charging pad to conserve energy, wherein the designated charging pad charges the battery, and transmits a report back to the social robot when the UAV command is completed via the radio frequency transceiver, wherein the report details that the UAV command was completed.

2. The UAV of claim 1, wherein the UAV comprises a plurality of sensors.

3. The UAV of claim 2, wherein the plurality of sensors comprises one or more of a temperature sensor, an infrared sensor, a gyroscope, and a barometer.

4. The UAV of claim 1, wherein the UAV charges by the charging pad.

5. The UAV of claim 1, wherein the UAV charges via the charging pad by inducing energy from the charging pad.

6. The UAV of claim 1, wherein the flight mechanism is comprised of propellers.

7. The UAV of claim 1, wherein the UAV and the social robot communicate according to a wireless communication link according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, a Wi-Fi wireless protocol, a Bluetooth wireless protocol, a near field communication (NFC) wireless protocol or another well-known wireless communication protocol.

8. A method of performing tasks via an unmanned aerial vehicle (UAV), comprising:

receiving a user verbal request by a microphone of a social robot;

transforming the user verbal request to a command for a UAV by a processor of the social robot;

transmitting the command via a radio communication link to the UAV by the social robot;

receiving the command from a social robot by the UAV;

performing the command that is received from the social robot by the UAV, wherein the UAV flies to the location where the command is to be performed;

transmitting a report to the social robot by the UAV, wherein the report details that the UAV executed the command; and engaging in a dialog with a user of the social robot by the social robot, wherein the social robot recites the report that was transmitted by the UAV.

9. The method of claim 8, wherein the UAV addresses the user.

10. The method of claim 8, wherein the UAV addresses the user and assumes a certain position relative to the height of the user.

11. The method of claim 8, wherein the UAV addresses the user and assumes a position of 20 degrees below the head of the user if the user is relatively tall.

12. The method of claim 8, wherein the UAV addresses the user and assumes a position of 20 degrees above the head of the user if the user is relatively short.

13. The method of claim 8, wherein the UAV addresses the user and flies from side to side.

14. The method of claim 8, wherein the UAV flies 5 degrees to the left and 5 degrees to the right when addressing the user.

15. A method of performing tasks via a plurality of unmanned aerial vehicles (UAVs), comprising:

receiving a command from a social robot by a first UAV;

flying to the location where the command is to be executed by the first UAV;

recognizing that a battery of the first UAV has been drained by flying to the location where the command is to be executed;

landing on a designated charging pad in close proximity to the first UAV by the first UAV, wherein the designated charging pad charges the battery of the first UAV;

transmitting the command to a second UAV by the first UAV;

performing the command transmitted from the first UAV by the second UAV;

landing on another designated landing pad, wherein the other designated charging pad charges a battery of a second UAV;

transmitting a report to the social robot by the second UAV, wherein the report details that the command was executed; and engaging in a dialog with a user of the social robot and the plurality of UAVs by the social robot, wherein the social robot recites the report that was transmitted by the second UAV.

16. The method of claim 15, wherein the designated charging pad receives alternating current (AC) power.

17. The method of claim 15, wherein the first and second UAVs charge via the designated and other designated charging pads by inducing energy.

18. The method of claim 15, wherein the first or second UAV maps an environment that it inhabits.

19. The method of claim 18, wherein the first or second UAV keeps the map stored to a memory of the UAV.

20. The method of claim 18, wherein the first or second UAV uses the map to navigate its environment.

* * * * *